United States Patent
Beyer et al.

(10) Patent No.: US 8,363,708 B2
(45) Date of Patent: Jan. 29, 2013

(54) RECEIVING CIRCUIT, METHOD FOR RECEIVING A SIGNAL, AND USE OF A DETECTION CIRCUIT AND A CONTROL CIRCUIT

(75) Inventors: Sascha Beyer, Medingen (DE); Tilo Ferchland, Dresden (DE); Thomas Hanusch, Coswig (DE)

(73) Assignee: Amtel Corporation, San Jose, CA (US)

( * ) Notice: Subject to any disclaimer, the term of this patent is extended or adjusted under 35 U.S.C. 154(b) by 960 days.

(21) Appl. No.: 12/423,599

(22) Filed: Apr. 14, 2009

(65) Prior Publication Data
US 2009/0257482 A1 Oct. 15, 2009

Related U.S. Application Data

(60) Provisional application No. 61/045,776, filed on Apr. 17, 2008.

(30) Foreign Application Priority Data

Apr. 14, 2008 (DE) .......................... 10 2008 018 871

(51) Int. Cl.
H04B 3/46 (2006.01)
H04B 17/00 (2006.01)
H04Q 1/20 (2006.01)
(52) U.S. Cl. ....................................... 375/224; 375/316
(58) Field of Classification Search .................. 375/324, 375/316
See application file for complete search history.

(56) References Cited

U.S. PATENT DOCUMENTS

| 5,001,471 | A | 3/1991 | Snowden et al. | |
|---|---|---|---|---|
| 5,228,060 | A * | 7/1993 | Uchiyama | 375/316 |
| 6,633,753 | B1 | 10/2003 | Kido | |
| 7,295,517 | B2 * | 11/2007 | Anim-Appiah et al. | 370/232 |
| 7,697,533 | B2 * | 4/2010 | Tsai et al. | 370/392 |
| 7,907,555 | B1 * | 3/2011 | Sankabathula et al. | 370/284 |
| 2009/0285274 | A1 * | 11/2009 | Shiue et al. | 375/224 |
| 2010/0008239 | A1 | 1/2010 | Obermanns | |

FOREIGN PATENT DOCUMENTS

| DE | 690 19 373 T2 | 1/1996 |
|---|---|---|
| DE | 10 2006 021 100 A1 | 11/2007 |

OTHER PUBLICATIONS

Office Action for Chinese Patent Application 200910133562.2, Mar. 1, 2012.

* cited by examiner

*Primary Examiner* — Jean B Corrielus
(74) *Attorney, Agent, or Firm* — Baker Botts L.L.P.

(57) ABSTRACT

A receiving circuit, method for receiving a signal, and use of a detection circuit and a control circuit of a receiving circuit of a node of a radio network is provided to deactivate an analog signal processing and/or determination of digital data from a signal received over an antenna of the node, when a stored current frame of the digital data has been recognized as valid, and to activate the analog signal processing and/or the determination, when the transmission of the current frame over an interface of the control circuit has been confirmed, whereby the control circuit is connected to the detection circuit and/or an input circuit for deactivation and activation, and whereby the detection circuit is formed to determine the digital data from the received signal.

25 Claims, 2 Drawing Sheets

RECEIVING CIRCUIT, METHOD FOR RECEIVING A SIGNAL, AND USE OF A DETECTION CIRCUIT AND A CONTROL CIRCUIT

This nonprovisional application claims priority to German Patent Application No. DE 10 2008 018 871.9, which was filed in Germany on Apr. 14, 2008, and to U.S. Provisional Application No. 61/045,776, which was filed on Apr. 17, 2008, and which are both herein incorporated by reference.

BACKGROUND OF THE INVENTION

1. Field of the Invention

The present invention relates to a receiving circuit of the node of a radio network, a method for receiving a signal, and use of a detection circuit and a control circuit of the receiving circuit.

2. Description of the Background Art

Receiving circuits in radio networks may have a memory region in which the determined digital data are recorded. The data are read out (uploaded) from this memory region by an arithmetic logic unit after an interrupt of the program sequence in the register of the arithmetic logic unit. After being read out, the determined digital data are available for the program run in the arithmetic logic unit and are evaluated further in so-called protocol layers.

SUMMARY OF THE INVENTION

It is therefore an object of the present invention to improve a receiving circuit as much as possible. Accordingly, a receiving circuit of a radio network node is provided. The receiving circuit here is preferably integrated monolithically in a semiconductor chip. In addition to the receiving circuit, a transmission circuit can also be preferably provided so that the node in the radio network can communicate bidirectionally. The receiving circuit has an input circuit, which is connectable to an antenna to receive a signal. The input circuit preferably has analog and optionally digital circuit parts. Advantageously, an antenna input or the antenna itself together with the receiving circuit can be integrated into one and the same semiconductor chip.

The input circuit can be formed for the analog-to-digital conversion of the received signal into a digital signal. The analog-to-digital conversion of the received signal occurs preferably by means of an analog-to-digital converter. In this regard, the digital signal, which is obtained from the conversion of the received signal, has a content-related relationship to the received signal.

The evaluation circuit can be formed to evaluate the digital signal. The evaluation circuit has a detection circuit, a check circuit, and a control circuit. The evaluation circuit, the detection circuit, and the control circuit of the evaluation circuit are integrated together in a semiconductor chip, and can be placed in one another and doubly utilize the circuit parts. The evaluation circuit, the detection circuit, and the control circuit are defined by their functions in this regard.

The evaluation circuit can be connected downstream of the input circuit in the receive path. Preferably, the evaluation circuit is formed as a digital circuit. Due to the connection of the evaluation circuit and the input circuit in the receive path, the signals reach the input circuit and then the evaluation circuit from the antenna. The signals are filtered, decoded, stored, and/or converted thereby in the receiving circuit. Preferably, the path is defined by a plurality of circuits of the receiving circuit, said circuits which process the received signal further, particularly change or analyze or temporarily store it. Preferably, the evaluation circuit is directly connected to the input circuit by connecting an input of the evaluation circuit conductively to an output of the input circuit. The evaluation circuit is formed to evaluate the digital signal. Preferably, the evaluation circuit is formed to recover transmitted information from the digital signal.

The detection circuit can be formed to determine digital data from the digital signal. Digital data in this regard are a plurality of binary data, it being possible to assign each one and each zero a significance/information. For the determination, the digital data are extracted from the digital signal. For example, the data to be transmitted are spread with a code. The individual values of the spread code are also called a chip. To determine the digital data, these known chips are used to define the data. If data are transmitted without spreading, therefore at a chip rate, to determine the digital data, for example, the digital signal is compared with a threshold value in the detection circuit.

The check circuit can be formed to save the digital data. To this end, the check circuit itself may have a memory. Preferably, however, the check circuit has an access connection to a memory (RAM). Furthermore, the check circuit is formed to check a current frame of the digital data. A frame contains definable binary data of variable length. A frame may contain redundant data, which are used for checking the frame for transmission errors. A frame is defined, for example, in the industry standard IEEE 802.15.4.

Furthermore, the check circuit can be formed to output at least one check signal depending on the checking. Preferably, different check signals are output for different checks. Preferably, the check circuit is formed to determine the validity of the binary data of a frame. Advantageously, the check circuit is formed for a comparison of the binary data of a frame with predefined frame features. A current frame is the last received frame, which was loaded advantageously during the receiving from the detection circuit in a memory of the receiving circuit.

The control circuit can be connected to the check circuit and a control input of the detection circuit. The control circuit is formed to activate or to deactivate the determination of the digital data by means of a control signal at the control input of the detection circuit depending on the at least one check signal. Preferably, the control circuit is arranged outside of the receive path, so that the received signal or the digital signal derived from the received signal passes the control circuit in the receive path.

The object of the invention furthermore is to provide as improved a receiving method as possible. Accordingly, a method is provided for receiving a signal over an antenna of a radio network node. In addition to the receiving method, a transmission method may also be provided for bidirectional communication. A current frame with digital data is determined from the received signal. In so doing, the digital data are obtained by demodulation of the received signal.

The digital data can be recorded in a memory region. Subsequent digital data to be saved thereby overwrite in particular the previously determined data of a frame.

The digital data of the current frame can be checked. In a simple case, a checksum is formed, for example. The data can be checked by a cyclic redundancy check. For example, a shift register with hard-wired feedback can be provided for this purpose. A specific result, which is compared with additional data in the frame to check, for example, for transmission errors, is obtained by shifting through the register. Naturally, other checking methods can also be used alternatively or in addition.

In the case of a positive test result, the digital data of the current frame can be transmitted to an arithmetic logic unit of the node. The arithmetic logic unit is, for example, a computing core of a microcontroller. In the case of the positive test result, moreover, the determination of a following frame is deactivated. During the deactivation, the digital data, currently stored in the memory region, in the current frame are not overwritten. They remain therefore initially unmodified in the memory region. In contrast, in the case of a negative test result, therefore when the digital data do not meet the requirements, the determination is not deactivated. For example, the digital data do not meet the testing requirements when a frame could not be completely determined. It is also possible to transmit an acknowledgment to the sender node.

The determination of a not necessarily directly subsequent frame is again activated when the current frame is loaded into the arithmetic logic unit. The current frame can then be processed in the arithmetic logic unit. Preferably, to this end, the arithmetic logic unit in a program run in a protocol layer determines a control signal that effects the activation. The control signal belongs, for example, to the lowest layer in standard IEEE 802.15.4, whereas the checking is assigned to the MAC.

Some frames may not be determinable by the node between the last determined frame and the reactivation. The node is blind relative to this transmitted information between the deactivation and the renewed activation.

To deactivate or activate the determination of the following frame, preferably a supply voltage is connected to a detection circuit of the evaluation circuit or disconnected from said circuit. Alternatively or in combination, a clock signal is applied at the detection circuit to activate the evaluation. For deactivation, in turn, this clock signal is disconnected from the detection circuit. Advantageously, the output signals of the digital detection circuit in the off state are set to a defined value, for example, a logic.

The invention furthermore has the object of providing a use of a detection circuit and a control circuit. Accordingly, a use of a detection circuit and a control circuit in a receiving circuit of a radio network node is provided for deactivating a determination of digital data. The determination of the digital data from a signal received over an antenna of the node is deactivated when a stored current frame of the digital data has been recognized as valid. The current frame is recognized as valid when the digital data meet predefined requirements, for example, a particular format.

The detection circuit and the control circuit are likewise used to activate the determination when the transmission of the current frame via an interface of the control circuit has been acknowledged. An arithmetic logic unit that generates the acknowledgment by means of a signal is preferably connected via the interface.

The control circuit is connected to the detection circuit to deactivate the determination and to activate the determination. In this regard, the detection circuit is formed for determining the digital data from the received signal.

The embodiments described hereinafter refer to both the receiving circuit and the method, as well as to the use.

According to an embodiment, the check circuit can be formed to compare an address, contained in the digital data frame, with a node identification. In addition, still further conditions, such as, for example, the receiving of a complete frame, can be checked. Furthermore, the check circuit is advantageously formed to output a check signal corresponding to a comparison result of the comparison. Preferably, the control circuit is formed to output a control signal to deactivate the determination of the digital data in the case of identity of address and identification.

The control circuit can have a logic and a register connected to the logic. Advantageously, the logic is formed to output the control signal for deactivation for the case of identity depending on a register value in the register. A first register value is assigned, for example, to the comparison of address and identity. In contrast, a second register value is assigned to turn off the comparison, so that the checking of the address does not occur or does not lead to the deactivation of the determination of the digital data by means of the logic. For this purpose, the logic has, for example, an AND operation for the register value and the check signal.

According to an embodiment, the register can have a register connection for programming at least the register value. The register connection is, for example, a register input for entering register values. The register value can be read out in addition via a register output. In this case, the register connection is advantageously a bidirectional interface.

In an embodiment, it is provided that the deactivation of the determination of the digital data is modifiable exclusively by programming of a register value in the register. The control circuit is formed in such a way that the deactivation of the determination of digital data is otherwise independent of a program run implemented in a connected arithmetic logic unit. Accordingly, the deactivation occurs preferably in a self-sustaining manner by the check circuit, the control circuit, and the detection circuit.

According to another embodiment, the evaluation circuit can have a serial or parallel interface for an arithmetic logic unit. The control circuit is formed to activate the determination of the digital data by means of a control signal at the control input of the detection circuit depending on an interface signal transmitted via the interface. In this case, other measured signals or data can be considered by the control circuit in forming the control signal. The arithmetic logic unit can be realized on a separate semiconductor chip. Alternatively, the arithmetic logic unit is integrated together with the receiving circuit in a semiconductor chip. For example, this type of arithmetic logic unit is a computing core or a microcontroller.

According to an embodiment, the detection circuit can have a preamble detector for detecting a preamble in the digital signal.

In an embodiment, for checking an address contained in the current frame it is compared with an identification of the node. The determination of a following frame is deactivated only when identity of the address and identification is determined. Preferably, the digital data of the current frame are also transmitted to an arithmetic logic unit only when the identity of the address and identification is determined. The address can be saved, for example, as a binary number in a register.

According to another embodiment, the comparison of address and identification is turned on and off by a register value. Preferably, the turning on or off is carried out in a program run of the arithmetic logic unit. Turning off of the comparison of address and identification can be required, for example, for a transmission not conforming to a standard.

According to an embodiment, it is provided that to deactivate the determination detection of a preamble is stopped.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
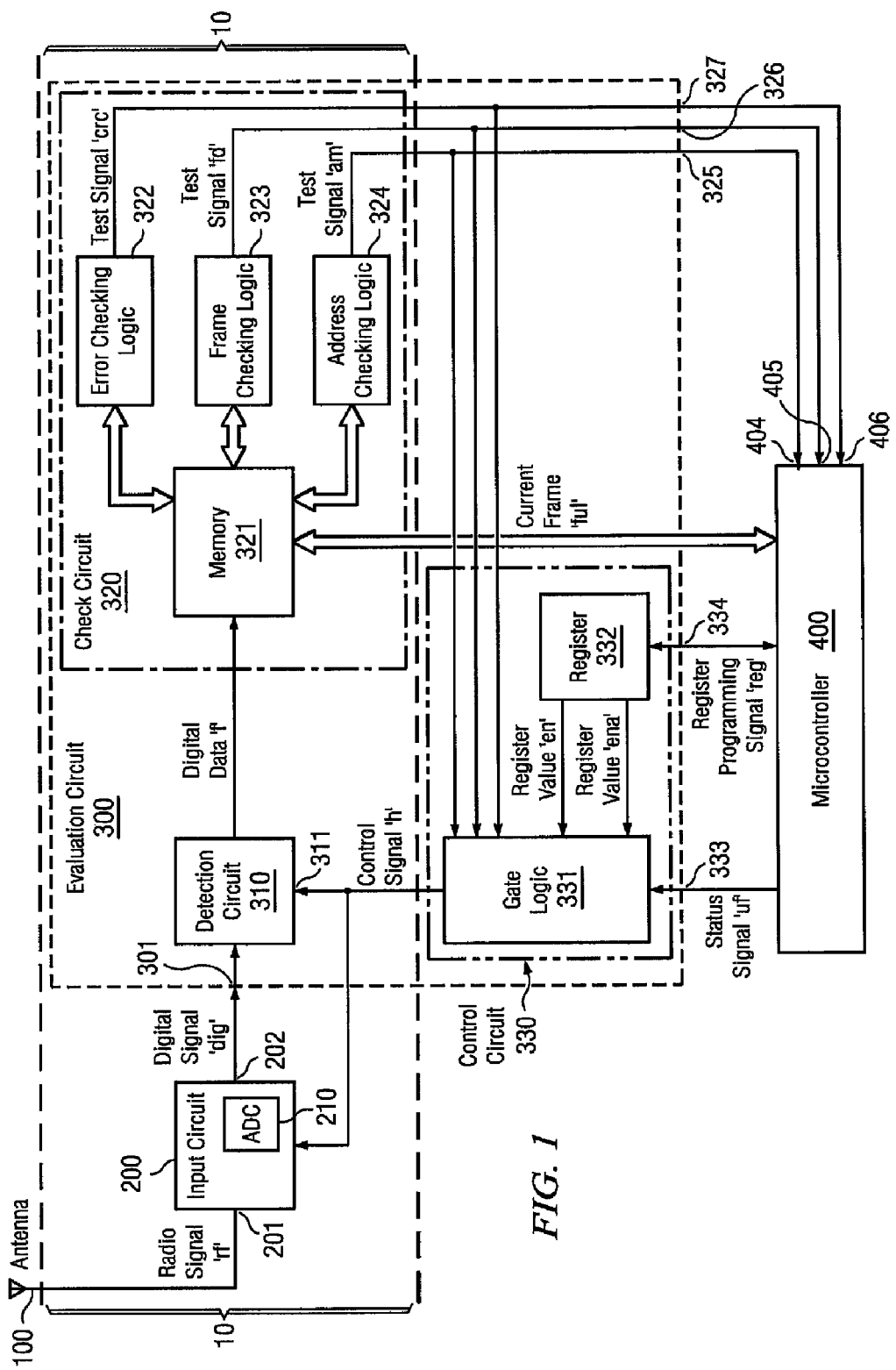
FIG. 1 is a schematic block circuit diagram of a receiving circuit.

FIG. 1 shows a block circuit diagram of a receiving circuit schematically. An input circuit 200 and an evaluation circuit 300 are provided in a receive path 10, whereby evaluation circuit 300 is connected downstream of input circuit 200 in receive path 10. An input 201 of input circuit 200 is connected to an antenna 100 for receiving a high-frequency radio signal rf. Input circuit 200 of the receiving circuit in the exemplary embodiment of FIG. 1 in receive path 10 has, for example, an input amplifier, a mixer for downmixing to an intermediate frequency (e.g., 0 Hz or 10 kHz), a filter, and an analog-to-digital converter (ADC) 210. The input amplifier, the mixer, and the filter are not shown for a simplified explanation. Furthermore, input circuit 200 may have a limiter and an automatic amplification setting.

The signals transmitted by a transmitter are thereby transmitted over an air interface as a radio wave and received by antenna 100, whereby antenna 100 is connected to input 201 of input circuit 200. A local oscillator can supply an oscillator signal to the mixer, which downmixes the signal amplified by the input amplifier to an intermediate frequency, which can be filtered by the filter (not shown in FIG. 1).

Analog-to-digital converter 210 of the input circuit generates a digital signal dig, which unfiltered, filtered, or downsampled via output 202 of input circuit 200 reaches input 301 of evaluation circuit 300.

Evaluation circuit 300 has a detection circuit 310, a check circuit 320, and a control circuit 330. Detection circuit 310 and check circuit 320 are thereby connected one after another in receive path 10. Detection circuit 310 determines digital data f, which are recorded in a memory 321, from the digital signal dig. In the exemplary embodiment of FIG. 1, memory 321 is shown as part of check circuit 320. Advantageously, check circuit 320, contrary to the exemplary embodiment of FIG. 1, however, has an interface to a central RAM memory of the node; here, the digital data f are recorded in a specific, particularly reserved memory region.

To determine the data f, detection circuit 310 has a preamble detector, which detects a signal received over antenna 100 and thereby also the preamble contained in the digital signal dig. A preamble thereby is a fixed binary value sequence or sequence agreed upon between the sender node and the receive node, for example, alternating zeros and ones. A possible preamble is defined in the industry standard IEEE 802.15.4.

It is possible to activate and deactivate the detection of detection circuit 310. To this end, detection circuit 310 has a control input 311, the activation or deactivation occurring by means of a control signal h.

Check circuit 320 is shown only as a rough schematic in the exemplary embodiment of FIG. 1. Check circuit 320 has a complex logic for checking; the functions of the logic are shown as blocks 324, 323, and 322.

In function block 323, it is checked whether a frame of the digital data f in memory 321 is complete. To this end, the properties of the frame are set as conditions that are to be checked and must be met by the digital data f in memory 321 for a positive test result. In the case of a positive test result, function block 323 outputs a corresponding test signal fd.

In function block 322, the digital data f in memory 321 are checked for errors, particularly transmission errors. The data are checked, for example, by means of a cyclic redundancy check. For example, for this purpose, a shift register with hard-wired feedback can be provided (not shown). A specific result, which is compared with additional data in the frame to check, for example, for transmission errors, is obtained by shifting data f through the register. In the case of a positive test result, function block 322 outputs a corresponding test signal crc.

In function block 324, an address contained in the digital data f is checked by comparison with identification of the node. In the case of identity of address and identification, function block 324 outputs a test signal am.

Test signals fd, crc, and am are also output via outputs 325, 326, and 327 and reach inputs 404, 405, and 406 of a microcontroller core 400. Microcontroller core 400 in the exemplary embodiment has several additional inputs and outputs, which, also contrary to the illustration in the exemplary embodiment of FIG. 1, can be formed individually or together as a parallel or serial interface unidirectionally or bidirectionally. Depending on test signals fd, crc, and am, microcontroller core 400 begins to read out the current frame from memory 321 as information ful and to then evaluate it in a program running in microcontroller core 400.

Test signals fd, crc, and am reach control circuit 330 connected to testing circuit 320. Said circuit has a gate logic 331, whereby the test signals fd, crc, and am are applied at the inputs of gate logic 331. For example, the gate logic performs an AND operation, which ANDs the test signals fd, crc, and am with one another. Depending on the test signals fd, crc, and am, gate logic 331 of control circuit 330 outputs a control signal h, which reaches control input 311 of detection circuit 310 and deactivates the determination of the digital data f in the case of positive test results. Instead of a gate logic, function block 331 can also be formed as a status machine with flip-flops and the like.

Furthermore, control circuit 330 has a register 332, whereby the register values en, ena are programmable via an interface 334 by means of a programming signal reg of the microcontroller core. The individual logic functions of logic 331 can be turned on and off by means of the register values en and ena. The dependence of the control signal h on all test signals fd, crc, and am is to be turned on and off by the register value en. In the off state, the determination is activated continuously and independent of test signals fd, crc, and am by detection circuit 310.

The dependence of the control signal h only on the test signal am is to be turned on and off by the register value ena. Accordingly, the comparison result from the address and identification is not considered for the output of the control signal h. The deactivation of the determination of the digital data f in detection circuit 310 in the case of a turning off by means of the register value ena always occurs when a complete frame with error-free digital data f was determined, independent of the address contained in the data f.

After a completed deactivation, the activation of the determination of the digital data f is initiated by the microcontroller core via interface 333 by means of a status signal uf. The status signal uf is applied in this case at logic 331 as an input signal, so that the control signal h is formed depending on the status signal and causes reactivation of the detection of a (new) preamble.

Figure 2:
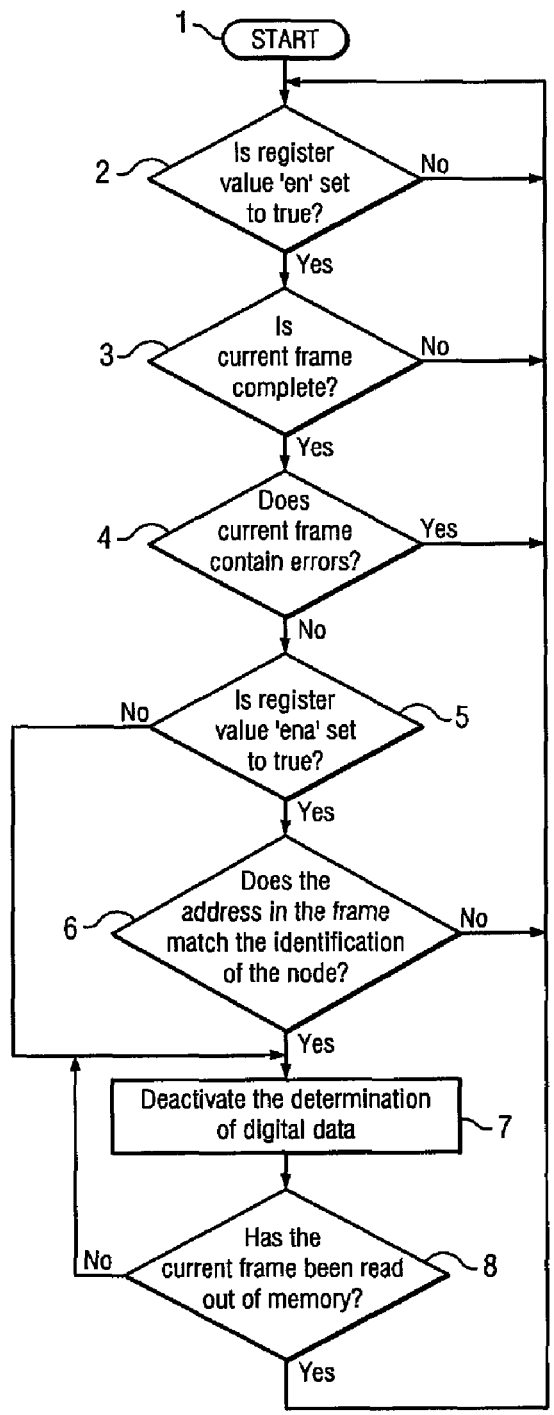
FIG. 2 is a schematic flowchart of a method.

FIG. 2 shows a schematic process sequence as a flowchart. The checking function is started in a first step 1. The program is then stopped in step 2 when the register value en is set to "false" (logic zero). In contrast, the process is continued in step 3 when the register value en is set to "true" (logic one).

It is checked in step 3 whether the current frame is complete and meets the predefined specification for a frame and accordingly outputs the test signal fd. In the negative case, the sequence is continued in step 2 with a new frame with new digital data f. In the positive case, in step 4 the digital data f of the frame are checked for errors and the test signal crc is output.

If errors are determined in digital data f in step 4, the program is continued in step 2 with a new frame with new digital data f. In the case of error-free data, the program is continued in step 5, a register value ena being read out in step 5. If the register value ena is a logic one, the sequence is continued in step 6, but if the register value ena is not a logic one, step 6 is skipped and the sequence is continued in step 7.

In step 6, the address in the frame with the digital data f is compared with an identification of the node. If the address is different from the identification, the process is continued in step 2 with a new frame. If there is an identity of address and identification, the process is continued in step 7 and the test signal am is output.

In step 7, the control signal h is set to the value for deactivating the determination of the digital data f. The frame contained in memory 321 is retained. In the next step 8, the status signal uf is interrogated. Said status signal uf is set only when the frame has been completely read out by microcontroller core 400 and can be evaluated in a program run in core 400. Microcontroller core 400 then sets the status signal uf, so that the determination of the digital data f is reactivated. As long as the status signal uf is not yet set, the determination in contrast continues to be deactivated and the sequence repeats steps 7 and 8. If the status signal uf is set by microcontroller core 400, the sequence is continued in step 2 with the activated determination of the digital data f for a new frame.

The invention is not limited to the shown embodiment variants in the figures. For example, it is possible to provide a sequence different from that in FIG. 2 for the block diagram shown in FIG. 1. It is also possible to use the sequence of FIG. 2 for a receiving circuit different from the one shown in FIG. 1. The functionality of the receiving circuit, according to the exemplary embodiment of the figure, and of the flowchart, according to the exemplary embodiment of FIG. 2, is used especially advantageously for a radio network of ZigBee industry standard IEEE 802.15.4.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A receiving circuit of a node of a radio network, the receiving circuit comprising:
   an input circuit that is operable to receive a signal from an antenna;
   an evaluation circuit that is connected downstream of the input circuit in the receive path, and
   wherein the input circuit is configured for analog signal processing with an analog-to-digital conversion of the received signal into a digital signal, and
   wherein the evaluation circuit is configured to evaluate the digital signal and has a detection circuit, a check circuit, and a control circuit, the detection circuit being configured to determine digital data from the digital signal, the check circuit being configured to save the digital data and to check a current frame of the digital data and to output at least one test signal based on the checking, and the control circuit being connected to the check circuit and a control input of the detection circuit and configured to activate or deactivate the analog signal processing and/or the determination of the digital data by a control signal at the control input of the detection circuit and/or at a control input of the input circuit depending on the at least one test signal;
   wherein the check circuit is configured to compare an address contained in a frame of the digital data with an identification of the node and is configured to output a first test signal corresponding to a comparison result of the comparison; and
   wherein the control circuit is configured to output the control signal to deactivate the determination of the digital data if the first test signal indicates that the address matches the identification of the node.

2. The receiving circuit according to claim 1, wherein the control circuit has a logic and a register connected to the logic, the logic being configured to output the control signal based on a register value of the register.

3. The receiving circuit according to claim 2, wherein the register has a register connection for programming at least the register value.

4. The receiving circuit according to claim 2, wherein the deactivation of the determination of the digital data is controlled exclusively by programming of the register value of the register.

5. The receiving circuit according to claim 1, wherein the evaluation circuit has an interface for an arithmetic logic unit, and wherein the control circuit is configured to activate the determination the digital data by the control signal at the control input of the detection circuit based on an interface signal transmitted via the interface.

6. The receiving circuit according to claim 1, wherein the detection circuit has a preamble detector for detecting a preamble in the digital signal.

7. A method for receiving a signal received over an antenna of a node of a radio network, the method comprising:
   determining a current frame with digital data from the received signal;
   checking the digital data of the current frame;
   transmitting, in the case of a positive test result, the digital data of the current frame to an arithmetic logic unit;
   deactivating, in the case of the positive test result, an analog signal processing and/or the determination of a following frame; and
   reactivating the analog signal processing and/or the determination of a following frame when the current frame is loaded in the arithmetic logic unit.

8. The method according to claim 7, wherein checking the digital data of the current frame comprises comparing an address contained in the current frame with an identification of the node, and wherein the determination of a following frame is deactivated only when the address matches the identification of the node.

9. The method according to claim 8, wherein the comparison of the address and the identification of the node is turned on and off by a register value.

10. The method according to claim 7, wherein detection of a preamble is stopped to deactivate the determination.

11. The method according to claim 7, wherein checking the digital data of the current frame is turned on and off by a register value.

12. A method, comprising:
receiving a signal from an antenna of a node of a radio network;
converting the received signal to a digital signal;
activating processing of the digital signal to obtain digital data from the digital signal;
obtaining a current frame of the digital data;
determining whether the current frame of digital data is valid;
upon determining that the current frame of digital data is valid:
deactivating processing of the digital signal;
transmitting the current frame over an interface to a processor; and
activating processing of the digital signal after the current frame is transmitted over the interface to the processor.

13. The method of claim 12, wherein determining whether the current frame of digital data is valid comprises comparing an address contained in the current frame with an identification of the node.

14. The method of claim 12, wherein determining whether the current frame of digital data is valid comprises determining whether the current frame of digital data contains errors.

15. The method of claim 12, wherein obtaining a current frame of the digital data comprises identifying a preamble in the digital data.

16. The method of claim 12, wherein deactivating processing of the digital signal is controlled using a register value.

17. A method, comprising:
receiving an analog signal from an antenna of a node in a radio network;
converting the analog signal into a digital signal;
outputting a control signal to activate a determination of digital data from the digital signal;
obtaining a current frame of digital data;
evaluating the current frame of digital data by comparing an address contained in the current frame with an identification of the node;
outputting an evaluation signal based on the evaluation of the current frame; and
outputting the control signal to deactivate the determination of the digital data if the evaluation signal indicates that the address matches the identification of the node.

18. The method of claim 17, wherein outputting the control signal to deactivate the determination of the digital data is controlled by a register value of a register.

19. The method of claim 17, further comprising:
transmitting the current frame over an interface to an arithmetic logic unit; and
outputting the control signal to activate the determination of digital data.

20. The method of claim 17, wherein obtaining a current frame of digital data comprises identifying a preamble in the digital data.

21. An apparatus, comprising:
an input circuit configured to:
receive an analog signal from an antenna of a node in a radio network;
convert the analog signal to a digital signal;
an evaluation circuit coupled to the input circuit, wherein the evaluation circuit comprises:
a detection circuit configured to process the digital signal to obtain digital data from the digital signal;
a check circuit configured to:
obtain a current frame of digital data;
determine whether the current frame of digital data is valid, and upon determining that the current frame of digital data is valid:
output an evaluation signal indicating that the current frame of digital data is valid;
transmit the current frame over an interface to a processor;
a control circuit configured to:
deactivate processing of the digital signal upon receiving the evaluation signal indicating that the current frame of digital data is valid; and
reactivate processing of the digital signal after the current frame is transmitted over the interface to the processor.

22. The apparatus of claim 21, wherein the check circuit configured to determine whether the current frame of digital data is valid is further configured to compare an address contained in the current frame with an identification of the node.

23. The apparatus of claim 21, wherein the check circuit configured to determine whether the current frame of digital data is valid is further configured to determine whether the current frame of digital data contains errors.

24. The apparatus of claim 21, wherein the check circuit configured to obtain the current frame of digital data is further configured to identify a preamble in the digital data.

25. The apparatus of claim 21, wherein the control circuit configured to deactivate processing of the digital signal is further configured to deactivate processing of the digital signal only when indicted by a register value of a register.

* * * * *